March 12, 1963 — Z. J. JANIA — 3,080,768
AUTOMATIC CONTROL MECHANISM
Filed Nov. 26, 1956 — 2 Sheets-Sheet 1

INVENTOR.
ZBIGNIEW J. JANIA

3,080,768
AUTOMATIC CONTROL MECHANISM
Zbigniew J. Jania, Detroit, Mich., assignor to Ford Motor Company, Dearborn, Mich., a corporation of Delaware
Filed Nov. 26, 1956, Ser. No. 624,459
17 Claims. (Cl. 74—472)

My invention relates generally to fluid pressure operated control mechanisms and more particularly to a new and improved hydraulic control valve circuit capable of regulating the operation of the clutch and brake elements of a multiple speed automatic power transmission mechanism or the like.

Many of the automotive type automatic transmissions currently used in the industry comprise compounded planetary gear members which drivably couple the power input member and a power output member such as the vehicle drive shaft, the relative motion of the gear elements being controlled by means of hydraulic pressure operated clutch and brake elements. A control valve circuit is provided for energizing the individual clutch and brake elements to effect variations in the overall speed reduction ratio of the power delivery gear train. The control valve circuit normally includes a fluid pressure source and conduit structure for establishing fluid communication between the fluid pressure source and the clutch and brake elements. This conduit structure is comprised in part by a plurality of movable control valve elements capable of selectively distributing fluid pressure to various portions of the circuit to energize the elements of the clutch and brake means in a desired sequence to establish a suitable shift pattern. The valves further function to regulate the magnitude of the pressures in the various portions of the circuit and to maintain the same at an optimum value for any given set of operating conditions.

In an automatic transmission of this type it is essential to provide suitable control signals which act on the various valve elements of the transmission so that the effective reduction ratio of the gear train and the shift pattern obtained during operation will be determined by the vehicle operating requirements. It is common practice in the transmission art to utilize vehicle speed and engine torque as two of the control parameters for influencing the operation of the shift valves. To obtain a suitable engine torque signal, a throttle valve may be provided within the circuit for the purpose of establishing a pressure which is proportional to engine throttle setting, the latter having a relationship to engine output torque. A suitable mechanical linkage may be interposed between the engine throttle and the throttle valve of the control circuit for adjustably positioning the latter. The throttle pressure thus established is caused to act on one or more shift valves within the valve circuit for establishing one of the valve actuating forces. A suitable vehicle speed signal may be obtained by providing a suitable fluid governor mechanism having portions drivably coupled to the transmission power output member, said governor mechanism being capable of supplying a governor pressure which may be caused to act on the shift valve to balance the forces established by the above mentioned throttle pressure. As the throttle pressure and governor pressure vary in magnitude during operation, the shift valves are actuated in sequence to distribute fluid pressure to the appropriate gear control elements thereby establishing the proper reduction ratio for any given set of operating conditions.

The fluid pressure source may comprise a fluid pump and a pressure regulator valve normally cooperates therewith for the purpose of regulating the magnitude of throttle pressure within the valve circuit, said control pressure being used to energize the transmission clutch and brake elements. It is desirable to vary the magnitude of the control pressure so that the degree with which the transmission clutch and brake elements are energized is proportional to the torque demands. In other words, the control pressure applied to the clutch and brake elements under any given set of operating conditions should be sufficient to prevent slipping during operation but the pressure should not be sufficiently great to cause a rough or harsh shift during a shift sequence. Since the throttle pressure is an indicator of engine torque it is used in many control schemes of known construction to adjust the pressure regulating characteristics of the regulator valve so that the magnitude of the control pressure within the circuit will be proportional to engine torque.

It is thus apparent that the same throttle pressure is employed for two distinct purposes. That is, it is used in a control circuit of the type described to establish the shift points for the shift valves and also to establish an optimum control pressure level. Although each of these distinct functions is not inconsistent with the other, they are nevertheless somewhat less than wholly compatible. For example, the variation in control pressure for various road conditions which is necessary to maintain an optimum torque capacity in the transmission control elements is not necessarily the same as that variation which would be necessary to establish the most desirable shift points. As a result, it has heretofore been necessary to arrive at a compromise and to obtain a variation in throttle pressure which deviates somewhat from that which would be necessary for an optimum quality shift pattern.

According to a principal feature of my invention, I have provided a control mechanism of the type above described wherein a first regulated pressure is caused to act on the control pressure regulator valve to establish a desired operating control pressure level and wherein a second independent regulator pressure is used in cooperation with the road speed governor pressure to establish the desired shift points, both of the pressures being produced by separate valve elements. Each of these separate valve elements includes a movable component situated in a portion of a control pressure passage and the valve elements are in turn operatively connected to the engine throttle through a mechanical linkage. According to a preferred form of my invention, each of the mechanical linkages includes a cam capable of being rotated upon movement of the engine throttle, the rotary motion of each cam being translated into a linear movement of the associated valve component. The cams may be referred to as information storing devices having a contour designed to produce the necessary regulated pressure for establishing the shift points and for adjusting the pressure regulator characteristics of the control pressure regulator valve. This obviates the need for the above mentioned compromise since the separate regulated control pressures may be varied during operation independently of each other to accomplish the independent functions of the shift valves and of the control pressure regulator valve.

The provision of a new and improved mechanism of the type above described being a principal object of my invention, it is a further object of my invention to provide a control mechanism for use with an automotive type, multiple speed, automatic transmission wherein shifts from one speed ratio to another during operation may be effected automatically with a maximum degree of smoothness.

It is a further object of my invention to provide a new and improved control mechanism for an automatic multiple speed power transmission which is substantially simpler in design than the transmission control systems of known construction.

It is a further object of my invention to provide an automatic transmission control valve circuit of the type above described wherein means are provided for establishing independent pressures in various portions of the circuit to obtain a shift quality which is superior to that of transmission control mechanisms of known construction.

Further objects of my invention will readily become apparent from the following description and from the accompanying drawings wherein.

Figure 1:
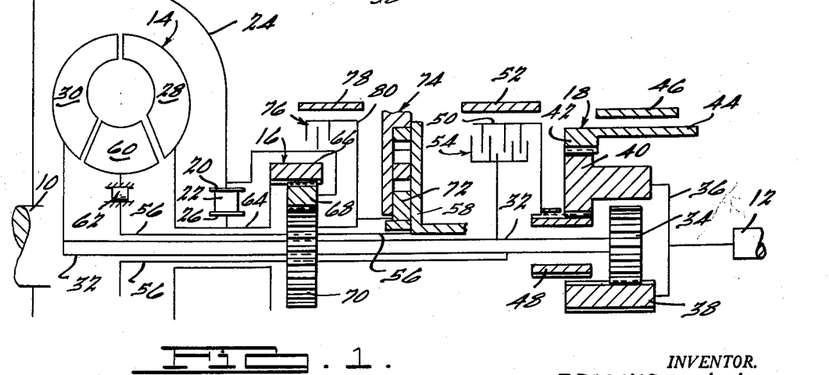
FIGURE 1 shows a schematic representation of the planetary gear arrangement for a multiple speed transmission capable of utilizing the improved control valve mechanism of my invention.

Referring first to FIGURE 1, numeral 10 is used to designate the crankshaft of an automotive vehicle engine and numeral 12 is used to designate the transmission power output shaft which may be mechanically connected to the vehicle traction wheels in a conventional fashion. The transmission includes a hydrokinetic torque converter 14, an overdrive planetary unit 16 and a second planetary unit 18. Vehicle engine power may be transferred from crankshaft 10 to the outer race 20 of a one-way clutch 22 through a suitable drive member 24. The inner race 26 of the one-way clutch 22 is connected to the hub of the pump member 28 of the hydrokinetic torque converter 14. The turbine member 30 of the hydrokinetic torque converter 14 is positively connected to an intermediate power delivery shaft 32 which extends throuugh the overdrive planetary unit 16 to the sun gear 34 of the second planetary unit 18. The latter further includes a carrier 36 on which compound planetary gear elements are journaled, one set of planetary gear elements 38 being drivably engaged with the sun gear 34. The gear elements 38 are of the elongated type and they drivably engage secondary planetary gears 40 which in turn are drivably connected to a ring gear 42 which is carried by a brake drum 44, the latter being surrounded by a friction brake band 46. The carrier 36 is drivably connected to a power output shaft 12 as illustrated.

The planetary gear elements 40 are situated in driving engagement with a second sun gear 48 which in turn is positively connected to a drum 50. A friction brake band 52 surrounds the drum 50 and a multiple disc clutch 54 is provided for clutching together the drum 50 and the shaft 32.

A sleeve shaft 56 surrounds the shaft 32 and it is anchored to the transmission casing shown in part at 58. A reactor member 60 of the hydrokinetic torque converter 14 is suitably journaled for rotation in one direction about the axis of shaft 32 and is adapted to be braked by a one-way brake device 62 to the shaft 56.

The pump 28 is connected to a third shaft 64 concentrically positioned with respect to the shafts 32 and 56, the inner clutch race 26 being joined thereto as illustrated. The shaft 64 is positively connected to a ring gear 66 of the overdrive planetary unit 16 and the planet gears 68 of the planetary unit 16 are positively connected to the power delivery drive member 24 as illustrated. The sun gear 70 of the planetary unit 16 is concentrically journaled about the shaft 32 and is positively connected to the driving gear 72 of a positive displacement pump generally designated by numeral 74. The pump 74 forms a portion of the fluid control valve circuit which will hereinafter be described. The sun gear 70 is further connected to one part of a multiple disc clutch assembly 76, the latter being effective to clutch the sun gear 70 to the planetary gear 68. A friction band 78 surrounds a drum member 80 and is capable of braking the same during operation, said drum 80 forming a portion of the aforementioned multiple disc clutch 76. The clutches 55 and 76 and the brakes 46, 52 and 78 may be selectively energized during operation to provide three forward speeds and a reverse, one of the forward speeds being an overdrive, a second forward speed being an underdrive and a third forward speed being direct drive.

To effect low speed operation, brake 52 is energized thus anchoring the sun gear 48. Also, clutch 76 is energized for purposes which will subsequently become apparent. Power is thus delivered from the crankshaft 10 to the pump 28 through the one-way clutch 22. Power is then transferred from the driven turbine 30 to the shaft 32 and to the sun gear 34 of the rear planetary gear unit 18. Sun gear 34 drives pinions 38 which mesh with pinions 40 thus causing the latter to rotate about their axes in a direction which is the same as the direction of rotation of the sun gear 34. Since the sun gear 48 is held stationary, this rotation of the planet gears 40 causes the same to rotate about the axis if the shaft 32 thus delivering power to the output shaft 12 at a reduced speed ratio.

Second speed or direct drive operation may be obtained by disengaging the brake 52 and by energizing multiple disc clutch 54. This clutches the sun gear 34 to the sun gear 48 and the power delivered to the sun gear 34 by the shaft 32 is transferred directly to the power output shaft 12 since the planetary elements are locked up and turn as a unit. Clutch 76 remains energized during direct drive operation although it is apparent that it does not form a portion of the power delivery path.

To effect overdrive operation, the clutch 76 is disengaged and the brake 78 is energized while the brake 52 remains de-energized. It is thus apparent that the power delivery path will be altered and that power will now be transferred from the crankshaft 10 through the drive member 24 and directly into the carrier for the planet gears 68 of the overdrive planetary unit 16. Since the sun gear is anchored by the brake 78, it will serve as a reaction member and the ring gear 66 will be driven and will overspeed the crankshaft 10. This overspeeding will be permitted by the one-way clutch 22, and since the inner race 26 is thus overspeeding the outer race 20 of the one-way clutch 22, power will not be delivered through the same. Since the pump 28 is overspeeded in this fashion while the rear planetary unit maintains a direct drive ratio therein, the overall driving ratio will be an overdrive.

Although the multiple disc clutch 76 does not form a portion of the power delivery path during first and second speed operation, it is a necessary part of the mechanism since it locks up the overdrive planetary unit thus preventing an overspeeding of the sun gear 70 during deceleration of the vehicle. Further, it may be used to provide engine braking during forward drive providing the capacity of the same is sufficiently large to accommodate the delivery of a reverse torque.

To effect reverse drive operation, the rear brake 46 is energized while the remaining brakes 52 and 78 and the clutch 54 are de-energized, the clutch 76 remaining energized as in forward drive operation. It is thus apparent that power will be delivered to the sun gear 34 in the manner previously described and that the torque reaction will be taken by the ring gear 42 rather than the sun gear 48. This will cause the planet carrier 36 of the rear planetary unit to rotate in a reverse direction.

Figure 2:
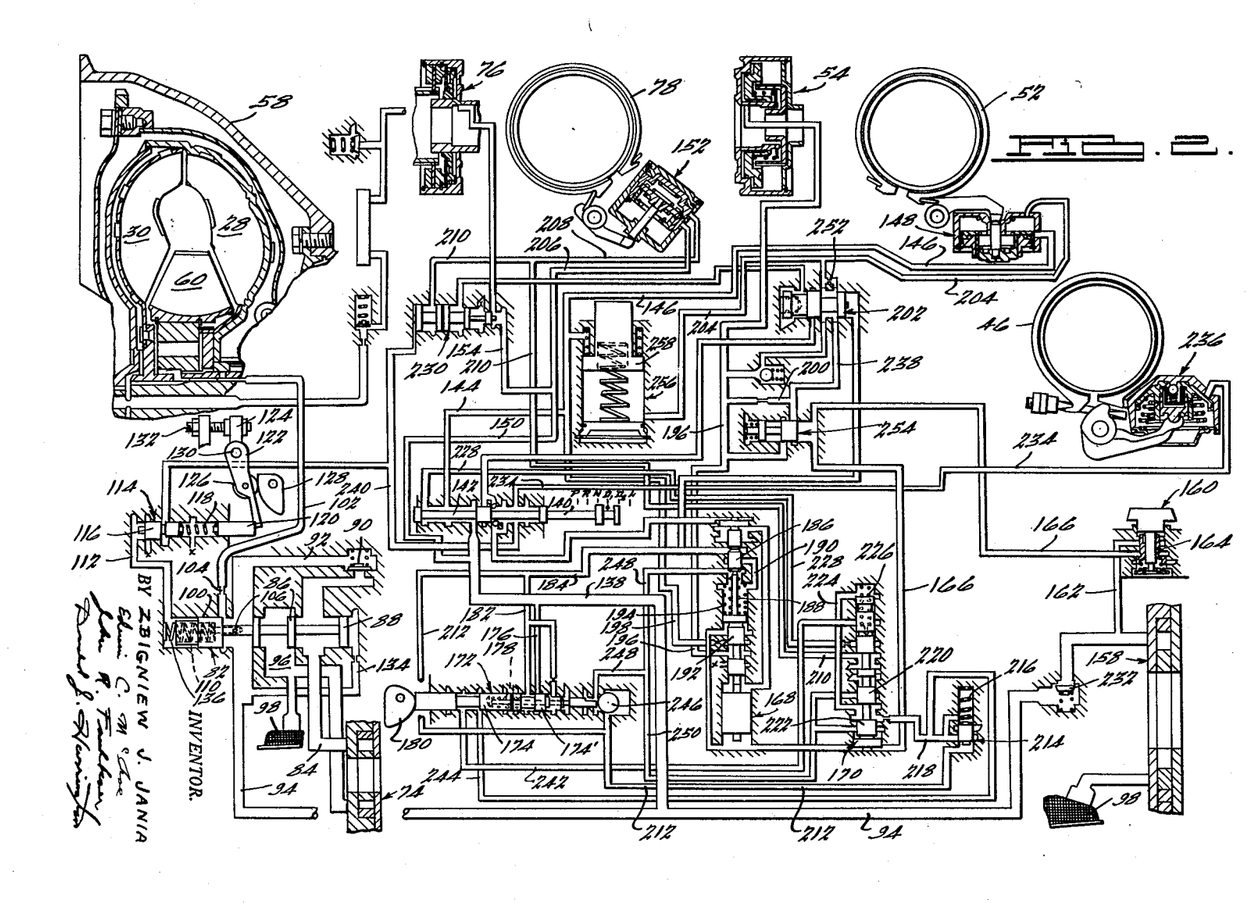
FIGURE 2 is a schematic illustration of the improved control valve mechanism embodying the principles of my instant invention.
Figure 3:
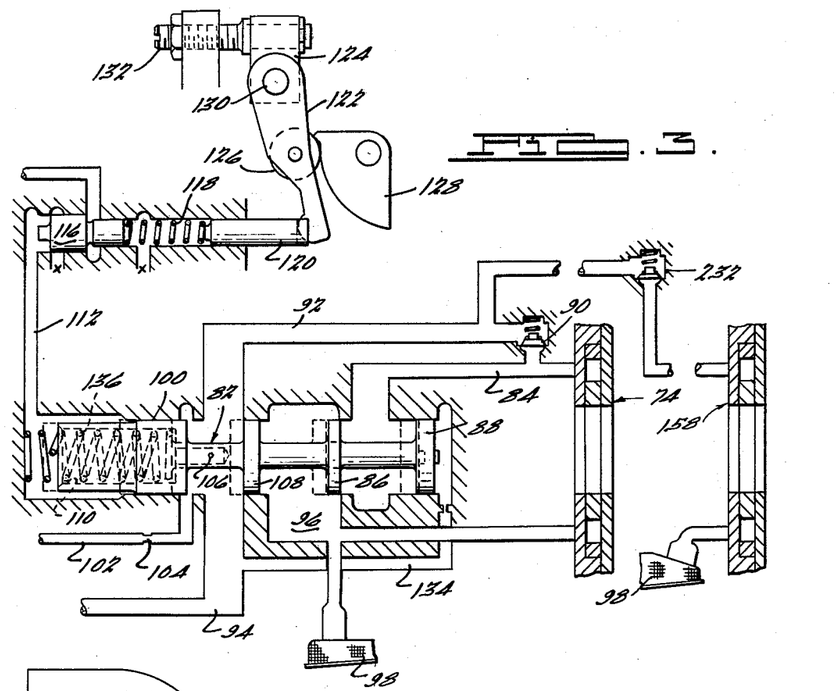
FIGURE 3 is an enlarged view of a portion of the control valve circuit of FIGURE 1 on an enlarged scale.

The control valve circuit for effecting the above described shifting operation is illustrated in FIGURES 2 and 3. Referring first to FIGURE 2, the above described front pump 74 is adapted to deliver fluid pressure to a pressure regulator valve 82 through a pump discharge passage 84, said passage 84 communicating with the valve chamber for the valve 82 between two valve lands 86 and 88 of equal diameters. The discharge pressure for the front pump 74 is free to pass through a one-way check valve 90 into a passage 92. A main line pressure passage 94 communicates with passage 92 and it is adapted to supply the control valve circuit with a regulated line pressure. The valve land 86 of the valve 82 is adapted to regulate the degree of communication between the portion of the valve chamber between lands 86 and 88 and an exhaust passage 96 which extends to a low pressure oil sump having a suitable filter screen 98.

Another valve land 100 is adapted to regulate the degree of communication between pump discharge passage 92 and a converter feed line 102, the latter having a suitable restriction 104 therein for reducing the line pressure to a desired level.

The valve 82 is formed with a precalibrated orifice 106 located by the land 100 and it provides communication between an internal passage 110 and the pump discharge passage 92. The internal passage 110 extends to one end of the valve chamber for the valve 82 which in turn communicates with a valve controlled exhaust passage or auxiliary passage 112. Passage 112 in turn extends to an exhaust control valve or pilot valve means 114 which comprises a movable pilot valve element 116 slidably situated within a cooperating valve chamber. Fluid pressure within passage 112 acts on the pilot valve element 116 thus urging the latter in a right hand direction as viewed in FIGURE 2 against the opposing force of the spring 118. Valve element 116 is adapted to progressively restrict the degree of communication between passage 112 and an adjacent exhaust passage designated by the letter "X." Valve spring 118 is adapted to seat against a movable valve plug 120 which may be adjustably positioned by a lever 122 pivotally mounted on a suitable adjusting mechanism 124. The lever 122 is adapted to carry a circular cam follower 126 which may engage the cam surface of a cam 128 pivotally mounted adjacent thereto. The pivot point 130 for the lever 122 may be conveniently adjusted with respect to the valve plug 120 by manually adjusting the threaded element 132.

The fluid discharged by the front pump 74 is caused to pass through the discharge passage 92 and a portion thereof passes through precalibrated orifice 106 thereby creating a pressure drop thereacross. This pressure differential is transferred to opposed sides of the valve 82, a suitable transfer passage 134 being provided for this purpose. Immediately after the pump 74 begins to operate, the valve 82 will begin to move to the left. As the pressure in the valve circuit builds up, the flow through the orifice 106 reaches a value which is sufficient to create the required pressure differential to overcome the bias force of a governor valve spring shown at 136. After a predetermined pressure build up, the converter feed line 102 becomes uncovered by the valve land 82 and the converter 14 is thus charged with fluid to condition the same for operation as the torque multiplying unit. Upon a further increase in pressure build up, the valve land 86 begins to unseat and to provide a restricted communication between passage 84 and passage 96. It is thus apparent that the control pressure will increase to that value which causes the land 86 to become unseated and thereafter the magnitude of the line pressure is maintained at a substantially constant value.

It will be apparent from inspection of FIGURES 2 and 3 that the magnitude of the pressure differential across the orifice 106 will determine the point at which the land 86 becomes unseated and this in turn determines the magnitude of the control pressure level in the circuit. The magnitude of this pressure differential may in turn be regulated by the valve 114. As the lever 122 is moved clockwise about the pivot point 130, the valve spring 118 becomes compressed thus decreasing the degree of communication between passage 112 and the exhaust region. The addition of the lever 122 is in turn determined by the angular position of the cam 128 and the cam 128 may be mechanically connected to the engine throttle and movable therewith during operation of the vehicle. The cam surface of the cam 128 may be precalibrated in order to effect an optimum variation in engine throttle opening and the magnitude of the pressure in passage 112. A change in the magnitude of the pressure in the passage 112 will in turn result in a corresponding change in the pressure differential across the orifice 106. This in turn will cause the valve 82 to assume a new adjusted position thus restoring the pressure differential across the orifice 106. This newly adjusted position of the valve 82 will correspond to an adjusted line pressure.

Line pressure passage 94 communicates with passage 138 which is adapted to deliver regulated control pressure to a manual valve 140, said valve comprising a valve plunger 142 slidably positioned within a cooperating valve chamber. The valve element 142 may be adjustably positioned by the vehicle operator to any of a plurality of drive ranges by operating a suitable selector lever. The various positions for the valve element 142 are illustrated in FIGURE 2 by the letters "P," "R," "N," "D1," "D2" and "L." If it is assumed that valve element 140 is adjusted to the "D1" position as illustrated, control pressure will pass from passage 138 through the valve chamber for valve 142 and through passages 144 and 146 to the apply side of the low speed servo generally designated by numeral 152 thus releasing the associated brake band 78. Passage 150 communicates with branch passage 154 extending to the working chamber for the clutch 76 thereby energizing the same. Since the low speed servo 148 is energized, the brake band 52 brakes the sun gear 48 and the transmission is conditioned for low speed operation. As the vehicle operator opens the engine throttle setting, the engine speed increases and a driving torque will be delivered through the torque converter and through the rear planetary gears at a reduced speed ratio as previously explained.

As the vehicle continues to accelerate, a rear pump 158 begins to operate, said pump being operatively connected to the transmission power output shaft 12. A governor valve mechanism generally designated by numeral 160 is in fluid communication with the discharge side of rear pump 158 through a passage 162 and it comprises a movable valve element 164 capable of progressively restricting the degree of communication between passage 162 and a governor pressure passage 166. Centrifugal force urges valve element 164 in an upward direction as viewed in FIGURE 2 and this force is balanced by an opposed governor pressure force acting on an annular valve land formed on the valve element 164. It is thus apparent that the magnitude of the pressure in passage 166 will be a function of the speed of rotation of the power output shaft 12 and it may be utilized as a vehicle speed sensitive signal. This governor pressure is conducted through the passage 166 to the lower end of a first to second shift valve 168 and the lower end of the second to third shift valve 170.

A throttle valve is generally designated in FIGURE 2 by numeral 172 and it comprises a valve chamber within which are reciprocally mounted a pair of valve spools 174 and 174'. Control pressure is supplied to the throttle valve chamber through branch passage 176 and a valve spring 178 is interposed between the valve spools 174 and 174' for transmitting the motion of the former to the latter. Valve element 174 may be adjustably positioned by a suitable cam 180 which may be mechanically coupled to the throttle in parallel relationship with respect to the aforementioned cam 128 and movable jointly therewith. The valve spool 174' is adapted to control the degree of communication between passage 176 and a throttle pressure passage 182, the latter communicaitng with the throttle valve chamber and extending to the upper end of the first to second shift valve 168. The throttle pressure causes a valve plunger 186 to move in a downward direction against the opposing biasing force of valve spring 188 to provide a restricted communication between passage 184 and a branch passage 190 extending to that portion of the shift valve chamber above a spool valve element 192. The pressure admitted to the 1–2 shift valve chamber through branch 190 will thus be less than the magnitude of the throttle pressure in passage 184, the extent of the difference being determined by the calibration of the spring 188. A valve spring 194 urges the valve plungers 192 in a downward direction during operation of the transmission and it assumes a downward position during operation of the vehicle in the low speed ratio and while the transmission is in neutral.

The pressure force supplied by the governor pressure acting on the lower end of the shift valve 168 opposes the pressure force supply acting on the upper end of the valve element 192. As the vehicle begins to accelerate, the magnitude of the governor pressure becomes sufficiently great for a given throttle pressure to cause the valve element 192 to shift in an upward direction against the opposing force of valve spring 194. When the valve element 192 assumes such an upward position, a previously exhausted passage 196 is brought into communication with the passage 198, the latter communicating with the aforementioned passage 144 which is subjected to regulated control pressure as previously explained. The pressure thus transferred to passage 196 is transmitted to the direct drive clutch 54, said clutch 54 including a working chamber adapted to communicate with passage 196. The working chamber is defined in part by a piston which is retracted by a suitable clutch spring as illustrated. Fluid is simultaneously delivered from passage 196 to a branch passage 200 extending through a coast down shift control valve 202 and to a communicating passage 204 extending to the release side of the low speed brake servo 148. The overdrive clutch 76 remains energized as before and it will be noted that the aforementioned passage 150 communicates with a passage 206 extending to the release side of the overdrive brake servo 152, the apply side of the servo 152 communicating with a passage 208 which is exhausted through passage 210 and through the second to third shift valve 170 to an open exhaust port. It will thus be apparent that the brake 52 and the brake 78 will be de-energized while the clutches 54 and 76 are energized. This results in a direct drive intermediate speed ratio as previously explained in connection with the description of the schematic diagram of FIGURE 1.

Throttle pressure is transferred from passage 182 to passage 212 extending to the lower side of the second to third throttle pressure modulator valve shown at 214, said valve comprising a valve plunger situated within a suitable valve chamber and throttle pressure is caused to urge the same in an upward direction against the opposing force of the precalibrated valve spring 216. The valve plunger is capable of providing restricted communication between passage 212 and a passage 218 which in turn extends to the valve chamber associated with the second to third shift valve 170. The throttle pressure modulator valve 214 is effective to reduce the magnitude of the throttle pressure by a predetermined amount dependent upon the characteristics of the spring 216 and the reduced throttle pressure acts on the differential areas of valve lands 220 and 222. Throttle pressure also acts on the upper end of the valve 170 to produce an additional valve biasing force, passage 224 being provided for this purpose. A shift valve spring 226 is adapted to normally urge the valve 170 in a downward direction.

As the vehicle continues to accelerate for a given throttle setting after the transmission has shifted into direct drive as previously described, the upward biasing force of the governor pressure will urge the valve 170 in an upward direction against the opposing force exerted by the regulated throttle pressure thus causing the valve 170 to assume an upward position. This causes direct communication between passage 210 and a passage 228, both of which communicate with the second to third shift valve chamber. The passage 228 extends to the manual valve and it is subjected to regulated control pressure.

The control pressure thus transferred to passage 210 is directed to the apply side of the overdrive clutch servo 152 to energize the same and to the left side of a second to third transition valve 230, the latter comprising a multiple land valve spool which is adapted to assume a right hand position when passage 210 is energized thereby blocking passage 154 and exhausting the previously applied clutch 76. The exhaust passage in the valve 230 which is used for this purpose is designated by the letter "X." It is thus apparent that the overdrive brake 78 and the clutch 54 are both simultaneously energized while the brake 52 and the clutch 76 are both de-energized, the transmission thereby being conditioned for overdrive operation.

When the brake 78 is energized to effect overdrive operation, it will be apparent from inspection of FIGURE 1 that the front pump 74 will be rendered inoperative since the driving pinion 72 for the pump 74 is positively connected to drum 80. Under these conditions, the ratio of the discharge pressure of the rear pump 158 to the discharge pressure of the front pump 74 will be sufficiently great to cause the check valve 90 to assume a closed position as illustrated in FIGURE 2. A corresponding check valve 232 for the rear pump 158 will simultaneously open and control pressure will thereafter be supplied by the rear pump to the control circuit. The pressure in passages 94 and 92 will momentarily tend to rise very rapidly since the check valve 90 blocks the discharge path of the rear pump to the low pressure sump of the circuit. This instantaneous increase in pressure is transferred to the right side of the regulator valve land 88 thus causing the regulator valve element to assume a new adjusted position. When the regulator valve element assumes this new position, the valve land 108 will provide restricted communication between passage 94 and exhaust passage 96. The regulation will thereafter be accomplished by valve land 108 rather than the valve land 86. The new position of the valve element causes valve land 86 to move to a fully open opsition thereby permitting discharge of the front pump to bypass freely with a minimum of pressure drop into the low pressure region of the circuit. If the ratio of the discharge pressure of the rear pump to the discharge pressure of the front pump should become sufficiently high during operation of the transmission in the intermediate speed ratio to allow the rear pump to take over the pumping requirements of the controls, the discharge of the front pump will be thus bypassed across the open valve land 86 until the shift into overdrive range is effected. Once the overdrive shift has been accomplished, the front pump is rendered inoperative and the bypassing action is eliminated entirely.

When the manual valve is shifted into the reverse position designated by the letter "R," a passage 234 becomes subjected to line pressure and it extends to the apply side of a reverse band servo generally designated by numeral 236, said servo being adapted to engage and disengage reverse brake band 46. It will be apparent that the apply side of the overdrive servo 152 will be exhausted through passages 208 and 210 and through the exhaust port in the second to third shift valve. Likewise, the direct drive clutch 54 will be exhausted through passage 196 and the exhaust port in the first to second shift valve. Also, the apply side of the low speed servo 148 will be exhausted through passage 204, through a passage 238, through branch passage 200 and through passage 196 and the exhaust port in the first to second shift valve. Since the reverse band servo 236 and the clutch 76 are both energized, the transmission will be conditioned for reverse drive operation as previously explained. A passage 240 communicates with the manual valve and is subjected to control pressure when the manual valve is shifted to the reverse position. This control pressure is transferred to the regulator valve 114 and acts upon the valve element 116 to supplement the biasing force of the spring 118 thus causing an increase in the degree of communication between passage 112 and the exhaust region of the circuit. This is turn adjusts the pressure differential across the orifice 106 of the regulator valve and increases the level of the control pressure. This increase in control pressure is necessary in order to increase the capacity of the reverse band servo so that it might accommodate the increased torque accompanying reverse drive operation.

If it is assumed that the transmission is operating in the overdrive range, the second to third shift valve 170 would be in an upward position as previously explained. As the vehicle operator suddenly increases the engine throttle opening, the throttle valve 147 will be moved to a right hand position until the previously exhausted passage 242 is brought into communication with a reduced throttle pressure passage 244, both of which communicate with the throttle valve chamber. Passage 242, which thus becomes pressurized with a reduced throttle pressure, extends to the upper side of the second to third shift valve and it will urge the latter in a downward direction if the magnitude of the governor pressure acting on the lower side of the check valve 170 is low enough to permit this to occur. It will be observed that passage 234 is in constant communication with passage 218 located on the down stream side of the throttle pressure modulator valve 214. If a further downshift is desired, the engine throttle may be operated beyond its fully open position thereby causing a downshift detent control valve 246 to become unseated thereby causing communication between throttle pressure passage 212 and a passage 248 extending to the upper side of the first to second shift valve element 192. The valve element 246 is adapted to be contacted by the end of the throttle valve element 174' and it is thus under the control of the vehicle operator. In order to make certain that the second to third shift valve 170 will assume a downward position, an auxiliary passage 250 extends from passage 248 to the valve chamber for the second to third shift valve 170. The full throttle pressure is thus caused to act on the valve land 222 if the same is in an upshifted position.

In making a third to second downshift, it is necessary to exhaust the release side of the rear band servo 148. This is accomplished by causing the fluid to pass through the coast down shift control valve 202 and passages 238, 200 and 196. Throttle pressure is caused to act on the right side of the downshift control valve 202 to urge the same against the opposing spring force. At an increased throttle setting, the throttle pressure is sufficiently great to cause the valve 202 to assume a left hand position as illustrated in FIGURE 2 thus allowing the fluid to become exhausted in the low speed servo 148 with a minimum of difficulty during a downshift. However, when a downshift occurs at a reduced or zero throttle setting, the throttle pressure is sufficiently low in magnitude to allow the valve 202 to assume a right hand position thus making it necessary for the fluid which is exhausted from the rear band servo 148 to pass through a precalibrated restriction 252 to increase the time interval necessary to accomplish the downshift.

A forced downshift control valve 254 is situated in the passage extending to the release side of the low speed servo. One side of the valve 254 is subjected to governor pressure from passage 166 thus urging the same in a leftward direction against an opposing spring force. When the valve assumes the position shown in FIGURE 2, the fluid passing from the release side of the low speed servo 148 must pass through restricted passage 200 before it is exhausted through passage 196 and the exhaust port associated with the first to second shift valve. It is thus apparent that a greater time interval will be allowed for a downshift when it occurs at a relatively high vehicle speed as compared to the time interval required for a corresponding shift at a reduced vehicle speed. It is thought that such a time differential is required since the actual operating time necessary to accelerate the vehicle engine by a fixed percentage when the vehicle is operating at a relatively high speed is substantially greater than the time necessary to accelerate the vehicle engine by that same percentage when the engine is operating at a lower speed. Such an increase in engine speed should be effected during the shift interval before the transmission is conditioned for operation in the downshifted speed range in order to avoid a harsh transition from the higher speed ratio to the lower speed ratio.

In order to cushion the shift from the low speed range to the intermediate or direct drive range, the circuit is provided with an accumulator generally designated in FIGURE 2 by numeral 256. This accumulator includes a chamber within which a piston 258 is received. One side of the piston 258 is subjected to line pressure and the other side of the piston 258 communicates with passage 204 which was previously described and it extends to the release side of the low speed servo 148. It is thus necessary to move the accumulator piston 258 upwardly against the opposing force of the line pressure acting on the upper side thereof before a shift from low speed ratio to direct drive ratio can be accomplished. This cushions the application of the direct drive clutch 54 while simultaneously delaying the rate at which the low speed servo 148 becomes released. It is apparent that the accumulator 256 will be effective to provide the same time delay regardless of the magnitude of the control pressure level in the circuit since it is sensitive to changes in control pressure by reason of the fact that the piston 258 is acted on by the control pressure existing in passage 146.

It is apparent from the foregoing description that the throttle pressure is used as one of the control parameters for establishing the fixed points for each of the shifts and for determining the character of the shift sequence. It is thus necessary to establish a correlation between the control pressure and the engine speed torque characteristics. This may be accomplished by properly designing the contour of the cam 180 so that the change in engine torque for a given change in engine throttle setting will be reflected by the desired change in the effective throttle pressure. Likewise, the contour of the cam 128 will be selected so that the magnitude of the control pressure will be correlated with the engine performance characteristics thereby causing the clutch and brake elements to become energized to an optimum degree since the variation in control pressure required is not necessarily the same as the corresponding variation in throttle pressure for any given change in engine operating parameters. The contours of each of the cams may be designed independently of each other in order that their respective functions may be carried out to the best advantage.

While I have disclosed a preferred embodiment of my invention, I contemplate that variations therein may be made without departing from the scope of the invention as defined by the following claims.

What I claim is:

1. In a multiple speed power transmission mechanism for delivering power from a throttle controlled vehicle engine to a driven member, said mechanism including gear elements forming a driving power delivery path and means for controlling the relative motion of said gear elements to provide a plurality of gear reduction ratios; a control mechanism for energizing said motion controlling means comprising a fluid pressure source, conduit structure interconnecting said pressure source and said motion controlling means, a shift valve means situated in and partly defining said conduit structure, a personally operable valve means for producing an engine torque demand sensitive pressure, a portion of said conduit means being adapted to conduct said torque demand sensitive pressure to said shift valve means to establish a biasing force for actuating the latter, and a pressure regulator valve means for regulating the effective pressure supplied to said motion controlling means by said pressure source in proportion to engine torque demands, said last named means including a personally operable portion adapted to initiate changes in the regulated pressure level, a movable regulating valve element, and an auxiliary fluid flow passage including a flow restricting orifice, said personally operable portion being in fluid communication with said auxiliary passage and adapted to regulate the rate of flow of fluid through said orifice, said movable valve element being subjected to the pressure differential across said orifice, said personally operable valve means and said personally operable portion of said valve means being connected to the engine throttle for simultaneous movement therewith by means of motion transmitting elements connecting a movable portion of said personally operable valve means with the engine throttle and connecting said personally operable portion of said regulator valve means with the engine throttle, the ratio of the displacement between the engine throttle and said movable portion of said personally operable valve means being different than the ratio of the displacement between the engine throttle and said personally operable portion of said regulator valve means for a given range of engine throttle settings, the actual displacements of said movable portion of said personally operable valve means and said personally operable portion of said regulator valve means being related to the movement of the engine throttle by separate, continuous functional relationships.

2. In a control valve circuit for use with an automatic torque transmitting mechanism having at least one fluid pressure operated servo, a fluid pressure source, conduit structure interconnecting said fluid pressure source and said servo, a regulator valve means for maintaining a control pressure in said circuit which is functionally related in magnitude to the torque transmitting requirements of said mechanism including a movable valve element situated in a portion of said circuit, said movable valve element including portions subjected to fluid pressure to actuate the same, said regulator valve means further including a personally operable valve means situated in said circuit for controlling the magnitude of the pressure acting on said valve element, an auxiliary fluid flow passage including a flow restricting orifice, said personally operable valve means being in fluid communication with said auxiliary fluid flow passage and adapted to regulate the rate of fluid flow through said orifice, portions of said regulator valve means being subjected to the pressure differential across said orifice, a cam element having a calibrated, continuous cam surface, means for connecting said cam element and said personally operable valve means including a movable portion engageable with said cam surface, and means for adjustably positioning said cam element, the magnitude of the pressure level in said circuit thereby being controlled in response to movement of said cam element and the characteristics of said regulator valve means being determined by the geometry of said cam surface.

3. In a control valve circuit for use with an automatic power transmission capable of delivering power from a throttle controlled internal combustion engine to a driven member, a fluid pressure source, conduit structure communicating with the fluid pressure source, a regulator valve means for maintaining a control pressure in said circuit which is proportional in magnitude to the engine torque demands including a movable valve element situated in a portion of said circuit, said movable valve element including a portion subjected to fluid pressure to actuate the same, said regulator valve means further including a personally operable portion situated in said circuit for controlling the magnitude of the pressure acting on said valve element, an auxiliary fluid flow passage including a flow restricting orifice, said personally operable portion being in fluid communication with said auxiliary fluid flow passage and adapted to regulate the rate of fluid flow through said orifice, other portions of said regulator valve means being subjected to the pressure differential across said orifice, and means for connecting said personally operable portion and the engine throttle, said connecting means including a cam element for a calibrated, continuous cam surface and a movable part engageable with said cam surface, said cam element being adapted to be adjustably positioned by the engine throttle, the magnitude of the pressure level in said circuit thereby being in response to movement of said cam element and the characteristics of said regulator valve means being determined by the geometry of said cam surface.

4. In a multiple valve circuit for use with an automatic power transmission capable of delivering power from a throttle controlled internal combustion engine to a driven member, a fluid pressure source, conduit structure communicating with said fluid pressure source including a bypass passage extending to a low pressure region of said circuit, a regulator valve means for maintaining a control pressure in said circuit which is proportional in magnitude to the engine torque demands including a movable valve element situated in part in said bypass passage and adapted to variably restrict the same, an exhaust passage, a precalibrated orifice located in said movable valve element for accommodating a flow of fluid from an upstream portion of said bypass passage to said exhaust passage, branch passage means for subjecting said valve element to the pressure differential produced across said orifice to establish valve element actuating forces, exhaust valve means for progressively restricting said exhaust passage, and personally operable means connecting said exhaust valve means and the engine throttle for adjustably positioning said exhaust valve means thereby regulating the pressure differential across said orifice, the pressure level maintained in said circuit thereby being controlled by said exhaust valve means at a level determined in part by the engine throttle position.

5. In a control valve circuit for use with an automatic power transmission capable of delivering power from a throttle controlled internal combustion engine to a driven member, a fluid pressure source, conduit structure communicating with said fluid pressure source including a bypass passage extending to a low pressure region of said circuit, a regulator valve means for regulating a control pressure in said circuit which is proportional in magnitude to the engine torque demands including a movable valve element situated in part in said bypass passage and adapted to variably restrict the same, an auxiliary exhaust passage, a precalibrated orifice located in said movable valve element for accommodating a flow of fluid from an upstream portion of said bypass passage to said exhaust passage, branch passage means for subjecting said valve element to the pressure differential produced across said orifice to establish valve element actuating forces, exhaust valve means for progressively restricting said exhaust passage, and a cam having a precalibrated cam surface adapted to act on a portion of said exhaust valve means, said cam being connected to the engine throttle and movable therewith to effect variations in the pressure level maintained in said circuit the characteristics of said regulator valve means may be determined by the geometry of said cam surface.

6. In a control valve circuit for an automatic transmission, the latter including gear elements adapted to deliver power from a throttle controlled engine to a driven member, said transmission including a fluid pressure operated gear control mechanism, a fluid pressure source, conduit structure interconnecting said pressure source and said control mechanism, a shift valve means situated in and partly defining said conduit structure for controlling the distribution of fluid pressure to said control mechanism, a throttle valve means having a portion in communication with the discharge side of said pressure source for producing an engine torque sensitive throttle pressure, a passage interconnecting said shift valve means and said throttle valve means thereby accommodating the delivery of throttle pressure to the former, a main pressure regulator valve means for maintaining an effective pressure in said circuit which is proportional in magnitude to the engine torque demands, said regulator valve means including a bypass passage situated on the discharge side of said pressure source, a valve element situated in said bypass passage and adapted to control the degree of communication between said conduit structure and said bypass passage, an auxiliary bypass passage extending from said conduit structure to a low pressure region of said circuit, a precalibrated orifice partly defining said auxiliary bypass passage, opposed portions of said valve element being subjected to the pressure differential across said orifice, and exhaust valve means for regulating the rate of flow of fluid through said auxiliary bypass passage and said orifice thereby controlling the pressure level in said circuit, said throttle valve means and said exhaust valve means each including a portion operatively coupled to the engine throttle, the pressure regulator valve means thereby being effective to establish a pressure level in said conduit structure which has a definite functional relationship to throttle position.

7. In a control valve circuit for an automatic multiple speed power transmission capable of delivering power from a throttle controlled engine to a driven member, a fluid pressure source, a fluid pressure operated gear control element, conduit structure interconnecting said fluid pressure source and said control element, a shift valve means for controlling the distribution of pressure to said control element, a pressure regulator valve means for varying the pressure level existing in said circuit in proportion to engine torque demands, a throttle valve means situated in said circuit for establishing a throttle pressure of relatively reduced magnitude, said shift valve means being subjected to throttle pressure and cooperating with opposed forces acting thereon to actuate the same, manually operable means for independently actuating said throttle valve means and a portion of said regulator valve means to establish an optimum regulated control pressure in said circuit and an optimum throttle pressure for various operating conditions, said manually operable means including motion transmitting elements connecting the engine throttle with said portion of the regulator valve means and with said throttle valve means, the ratio of the displacement between the engine throttle and said portion of the regulator valve means being different than the ratio of the displacement between the engine throttle and said throttle valve means for a given range of engine throttle settings, the actual displacements of said portion of the regulator valve means and of said throttle valve means being related to the movement of the engine throttle by separate, continuous functional relationships and an auxiliary fluid flow passage including a flow restricting orifice, said portion of the regulator valve means being in fluid communication with said auxiliary passage and adapted to regulate the rate of fluid flow through said orifice, portions of said regulator valve means being subjected to the pressure differential across said orifice.

8. The combination as set forth in claim 7 wherein said manually operable means includes separate connections between the engine throttle and said portion of the regulator valve means and between the engine throttle and said throttle valve means.

9. In an automatic multiple speed power transmission mechanism for delivering power from an engine to a driven member, said engine including a manually operated throttle, a fluid pressure operated gear control member, a fluid pressure source, conduit structure interconnecting said pressure source and said control member, a main regulator valve means for maintaining a desired pressure level in said conduit structure, means for manually adjusting said regulator valve means thereby varying the regulating characteristics thereof including an auxiliary fluid flow passage having a flow restricting orifice in fluid communication with portions of said regulator valve means, said valve means being subjected to the pressure differential across said orifice, the rate of fluid flow through said auxiliary passage being affected by adjustment of said regulator valve means, a shift valve means partly defining said conduit structure for sequentially distributing fluid pressure to various portions of said circuit, a throttle valve means for modulating the effective pressure in said conduit structure to establish a reduced throttle pressure, the latter acting on said shift valve means to actuate the same, means for manually adjusting said throttle valve means, said first and second named manual adjusting means each including a cam member acting on a movable portion of its associated valve means to adjust the same, and a connection between said engine throttle and each cam member, the variation in the effective regulated pressure in said conduit structure and in the throttle pressure for various engine throttle settings being independent of each other and defined at least in part by the contour of said cams.

10. In an automatic, multiple speed, power transmission for use with a throttle controlled engine for a wheeled vehicle, said transmission including at least one fluid pressure responsive gear control element for effecting changes in speed reduction ratios, a fluid circuit communicating with said gear control element including a fluid pressure source, regulator valve means situated in said circuit for regulating the discharge pressure of said pressure source to produce a control pressure of predetermined magnitude for energizing said gear control element, and transmission throttle valve means having portions situated in said circuit and subjected to said control pressure for modulating the latter to produce a regulated throttle pressure, said regulator valve means having portions exposed to said throttle pressure for biasing the same to effect variations in the level of said control pressure; a connection between said engine throttle and said transmission throttle valve means and between said engine throttle and a movable portion of said regulator valve means, each connection including a cam element engageable with a cam follower member adapted to adjustably position said throttle valve means and said movable portion of said regulator valve means respectively, the contour of each cam element being precalibrated so that the magnitude of the throttle pressure and the effective control pressure in said circuit at any given throttle setting is at an optimum value, an auxiliary fluid flow passage with a fluid flow restricting orifice, said movable portion of said regulator valve means being in fluid communication with said auxiliary fluid flow passage and adapted to control the rate of fluid flow therethrough, other portions of said regulator valve means being subjected to the pressure differential across said orifice.

11. In an automatic, multiple speed, power transmission for use with a throttle controlled engine for a wheeled vehicle including pressure responsive controlled elements, a fluid control valve circuit associated with said transmission for effecting speed ratio shifts including an assembly of movable valve elements mutually cooperating to selectively actuate said gear control elements and a pressure regulator valve means for maintaining an operating pressure level in said circuit which is functionally related in magnitude to the engine torque demands; a connection between the engine throttle and one of said movable valve elements and between the engine throttle and a movable portion of said regulator valve means, each connection including a cam element having a calibrated cam surface, and separate cam followers engageable with each cam surface, one valve element being displaced by one of said cam followers and said movable portion of said regulator valve means being displaced by the other of said cam followers upon movement of said engine throttle, the displacement of said one valve element and the displacement of the movable portion of said regulator valve means each being related to the engine throttle movement by means of separate, independent, non-linear, continuous, functional relationships whereby the optimum shift points and the optimim operating pressure levels are established under all driving conditions, an auxiliary fluid flow passage with a fluid flow restricting orifice, said movable portion of said regulator valve means being in fluid communication with said auxiliary fluid flow passage and adapted to control the rate of fluid flow therethrough, other portions of said regulator valve means being subjected to the pressure differential across said orifice.

12. In a control valve circuit for use with an automatic power transmission capable of delivering power from a throttle controlled internal combustion engine to a driven member, a fluid pressure source, a fluid pressure operated servo, a control valve circuit for regulating the distribution of fluid pressure to said servo including a throttle valve means for establishing an engine torque demand sensitive pressure, a shift valve means for controlling the distribution of fluid pressure to said servo, a regulator valve means for varying the effective pressure supplied to said servo by said pressure source in proportion to engine torque demands, said shift valve means including an element adapted to be subjected to said throttle pressure, means for adjustably positioning movable portions of said regulator valve means and said throttle valve means to vary the pressure level within said circuit and for controlling the magnitude of the throttle pressure applied to said shift valve element, said last-named means being defined in part by the engine throttle and including motion transmitting elements mechanically and positively connected to said engine throttle and adapted to establish independent calibrated ratios of the displacements of said movable portions of the regulator valve means and said throttle valve means relative to the movement of the engine throttle, the actual displacements of the portions of the regulator valve means and said throttle valve means being related to the movement of the engine throttle by separate, continuous functional relationships, and an auxiliary fluid flow passage including a fluid flow restricting orifice, said movable portion of said regulator valve means being in fluid communication with said auxiliary fluid flow passage and adapted to control the rate of fluid flow therethrough, other portions of said regulator valve means being subjected to the pressure differential across said orifice.

13. In a control valve circuit for use with an automatic power transmission capable of delivering power from a throttle controlled internal combusion engine to a driven member, a fluid pressure source, a fluid pressure operated servo, a control valve circuit for regulating the distribution of fluid pressure to said servo including a throttle valve means for establishing an engine torque demand sensitive pressure, a shift valve means for controlling the distribution of fluid pressure to said servo, a regulator valve means for regulating the effective pressure supplied to said circuit, said shift valve means including an element adapted to be subjected to said throttle pressure, and means for adjustably positioning movable portions of said regulator valve means and said throttle valve means to vary the pressure level within said circuit for controlling the magnitude of the throttle pressure applied to said shift valve element, said last-named means including separate cams associated with said throttle valve means and said regulator valve means respectively, said cams being mechanically connected to the engine throttle, each of said cams being adapted to transmit motion to the movable portions of their associated valve means relationships, and an auxiliary fluid flow passage including a fluid flow restricting orifice, said movable portions of said regulator valve means being in fluid communication with said auxiliary fluid flow passage and adapted to control the rate of fluid flow therethrough, other portions of said regulator valve means being subjected to the pressure differential across said orifice.

14. In an automatic mechanism having a plurality of fluid pressure responsive control elements, a fluid circuit including a fluid pressure pump, conduit structure interconnecting said pump and each of said control elements, a plurality of control valve elements disposed in and defining in part said conduit structure, bypass passage means defined by said conduit structure for transferring fluid from the delivery side of said pump to a low pressure region of said fluid circuit, a pressure regulator valve means including a movable regulator valve element with portions situated in said bypass passage means for varying the degree of communication between the delivery side of said pump and said low pressure region thereby providing a control pressure in said circuit for actuating said control elements, said bypass passage means being defined in part by a flow restricting orifice formed in said regulator valve element, pilot valve means disposed on the downstream side of said orifice for controlling the rate of fluid flow through said orifice, and a personally operable mechanical linkage means for positioning a movable part of said pilot valve means including a rotatable cam element having a precalibrated cam surface and a cam follower connected to the pilot valve means, said conduit structure further including a branch passage extending to opposed portions of said regulator valve element, the pressure differential existing across said orifice acting on said regulator valve element through said branch passage to produce a valve element biasing force, said pilot valve means thereby influencing the regulating characteristics of said pressure regulator valve means.

15. In an automatic power transmission mechanism for transmitting power from a driving member to a driven member with a plurality of speed reduction ratios, said mechanism including a plurality of fluid pressure responsive control elements; an automatic control system for selectively actuating said control elements including a fluid circuit having a fluid pump powered by said driving member, conduit structure interposed between said pump and said control elements, a pair of bypass passages interconnecting the discharge side of said pump with a low pressure region of said circuit, a pressure regulator valve element including portions separately defining in part each of said bypass passages, one portion of said regulator valve element providing controlled communication between the discharge side of said pump and said low pressure region through one of said bypass passages thereby producing a regulated control pressure in said circuit, spring means for normally biasing said regulator valve element toward a bypass passage closing position, a flow restricting orifice formed in said regulator valve element defining in part a second of said bypass passages, a pilot valve means including portions situated on the downstream side of said orifice for regulating the flow of fluid through said second bypass passage, a portion of said conduit structure being adapted to subject said regulator valve element to the pressure differential across said orifice to create a valve actuating force for balancing the force of said spring means and a manually operable mechanical linkage means for actuating a movable part of said pilot valve means including a rotatable cam having a precalibrated cam surface and a cam follower connected to said movable part of the pilot valve means, the regulating characteristics of said regulator valve element being determined by the geometry of said cam surface.

16. In a control mechanism having a fluid pressure source, a plurality of pressure responsive control elements and conduit structure providing communication between said pressure source and said control valve; pressure regulator valve means for maintaining the effective pressure in said conduit structure at a regulated value, an auxiliary passage extending from a high pressure region of said conduit structure to a lower pressure region, a flow restricting orifice situated in and partly defining said auxiliary passage, said orifice establishing a pressure differential thereacross, passage means for subjecting opposed portions of said regulator valve means to said pressure differential to actuate the same, pilot valve means including a pilot valve element situated in said auxiliary passage for controlling the flow capacity of the latter whereby the regulating characteristics of said pressure regulator valve means are controlled by said pilot valve means, and a linkage means for actuating said pilot valve means including a rotatable cam with a precalibrated cam surface and a cam follower connected to said pilot valve element, the regulating characteristics of said pressure regulator valve means being determined by the geometry of said cam surface.

17. In a control circuit having a fluid pressure pump, a plurality of pressure responsive control elements, conduit structure providing communication between said pump and said control elements and a bypass passage extending from the delivery side of said pump to the intake side thereof; pressure regulator valve means including a pressure regulator valve element disposed in said bypass passage and including bypass passage restricting portions for controlling the degree of communication between the delivery and intake sides of said pump and for regulating the effective pressure supplied by the latter, an auxiliary passage extending from a high pressure portion of said conduit structure to a low pressure region, a flow restricting orifice forming a portion of said auxiliary passage and adapted to produce a pressure differential thereacross, passage means for subjecting opposed portions of said regulator valve element to said pressure differential for actuating the same, a pilot valve means including a movable pilot valve element situated in said auxiliary passage on the downstream side of said orifice and adapted to control the rate of flow through the latter, the forces acting on said regulator valve element thereby being controlled by said pilot valve means, and a linkage means for actuating said pilot valve means including a rotatable cam having a precalibrated cam surface and a cam follower connected to said pilot valve element, the regulating characteristics of said regulator valve means thereby being determined by the geometry of said cam surface.

References Cited in the file of this patent

UNITED STATES PATENTS

| | | |
|---|---|---|
| 2,372,817 | Dodge | Apr. 3, 1945 |
| 2,645,137 | Roche | July 14, 1953 |
| 2,726,557 | Ackerman | Dec. 13, 1955 |
| 2,737,824 | Livermore | Mar. 13, 1956 |
| 2,742,862 | Banker | Apr. 24, 1956 |
| 2,766,639 | Rosenberger | Oct. 16, 1956 |
| 2,770,148 | Wayman | Nov. 13, 1956 |
| 2,815,684 | Roche | Dec. 10, 1957 |
| 2,841,168 | Levetus et al. | July 1, 1958 |
| 2,903,910 | Carnegie | Sept. 15, 1959 |